US007697090B2

(12) United States Patent
Shimizu (10) Patent No.: US 7,697,090 B2
(45) Date of Patent: Apr. 13, 2010

(54) ILLUMINATION UNIT AND LIQUID CRYSTAL DISPLAY DEVICE INCLUDING THE SAME (75) Inventor: Makoto Shimizu, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 164 days.

(21) Appl. No.: 12/107,291

(22) Filed: Apr. 22, 2008

(65) Prior Publication Data

US 2008/0303979 A1    Dec. 11, 2008

(30) Foreign Application Priority Data

Jun. 5, 2007    (JP)    ............................. 2007-149444

(51) Int. Cl.
*G02F 1/1335* (2006.01)

(52) U.S. Cl. ........................................ 349/65; 362/628

(58) Field of Classification Search .................. 349/62, 349/64, 65; 362/628
See application file for complete search history.

(56) References Cited

U.S. PATENT DOCUMENTS 7,583,353 B2 * 9/2009 Kujiraoka ................... 349/187

FOREIGN PATENT DOCUMENTS

JP    2006-201210    8/2006

* cited by examiner

*Primary Examiner*—Richard H Kim
(74) *Attorney, Agent, or Firm*—Finnegan, Henderson, Farabow, Garrett & Dunner, L.L.P.

(57) ABSTRACT

An illumination unit includes a light guide plate, and at least one optical sheet which is disposed on a major surface of the light guide plate. The optical sheet includes bent portions which are formed by bending portions of the optical sheet at a pair of opposed sides, and the light guide plate includes, at a pair of opposed end surfaces, recess portions in which the bent portions are inserted.

7 Claims, 6 Drawing Sheets

ILLUMINATION UNIT AND LIQUID CRYSTAL DISPLAY DEVICE INCLUDING THE SAME

CROSS-REFERENCE TO RELATED APPLICATIONS

This application is based upon and claims the benefit of priority from prior Japanese Patent Application No. 2007-149444, filed Jun. 5, 2007, the entire contents of which are incorporated herein by reference.

BACKGROUND OF THE INVENTION

1. Field of the Invention

The present invention relates generally to an illumination unit and a liquid crystal display device including the illumination unit, and more particularly to a structure for aligning an optical sheet of an illumination unit with a light guide plate and keeping the alignment state.

2. Description of the Related Art

A technique for fixing an optical sheet to a light guide plate has been proposed (see, e.g. Jpn. Pat. Appln. KOKAI Publication No. 2006-201210). According to this patent document, bosses (projections), which are integrally formed on a back surface of a light guide plate, are passed through through-holes of a reflection sheet, and inserted in boss-receiving holes provided in a metallic back-side casing. Thus, the reflection sheet is directly fixed to the back surface of the light guide plate.

In recent years, in order to increase the luminance of the liquid crystal display device, there has been a need to efficiently guide light, which is emitted from a light source, to a light guide plate. Thus, there is a tendency that the thickness of the light guide plate increases. It is very difficult to fabricate a thick light guide plate by injection molding. Under the circumstances, in particular, a light guide plate, which is applied to a liquid crystal display device with a relatively large screen size, is fabricated, in most cases, by a cutting process by cutting-out from a plate material.

However, it is difficult to fabricate the light guide plate having bosses on the back surface, as disclosed in the above-described patent document, by a cutting process. It is thus difficult to align the light guide plate, which is fabricated by the cutting process, with the optical sheet. Besides, for example, a separate member, such as a double coated adhesive tape, is needed in order to fix the optical sheet to the light guide plate in the state in which the optical sheet is aligned with the light guide plate, leading to such problems as complexity in structure, complexity in a fabrication step for fixation, and an increase in manufacturing cost.

BRIEF SUMMARY OF THE INVENTION

The present invention has been made in consideration of the above-described problems. An object of the invention is to provide an illumination unit which can easily align an optical sheet with a light guide plate and keep the alignment state, without the need for a separate member, and to provide a liquid crystal display device including this illumination unit. Another object of the invention is to provide an illumination unit which can simplify the structure for keeping the state in which an optical sheet and a light guide plate are aligned, and to provide a liquid crystal display device including this illumination unit.

According to an aspect of the present invention, there is provided an illumination unit comprising: a light guide plate; and at least one optical sheet which is disposed on a major surface of the light guide plate, wherein the optical sheet includes bent portions which are formed by bending portions of the optical sheet at a pair of opposed sides, and the light guide plate includes, at a pair of opposed end surfaces, recess portions in which the bent portions are inserted.

According to another aspect of the present invention, there is provided a liquid crystal display device comprising: a liquid crystal display panel; and an illumination unit which illuminates the liquid crystal display panel, the illumination unit comprising: a light guide plate; and at least one optical sheet which is disposed on a major surface of the light guide plate, wherein the optical sheet includes bent portions which are formed by bending portions of the optical sheet at a pair of opposed sides, and the light guide plate includes, at a pair of opposed end surfaces, recess portions in which the bent portions are inserted.

The present invention can provide an illumination unit which can easily align an optical sheet with a light guide plate and keep the alignment state, without the need for a separate member, and to provide a liquid crystal display device including this illumination unit.

In addition, the present invention can provide an illumination unit which can simplify the structure for keeping the state in which an optical sheet and a light guide plate are aligned, and to provide a liquid crystal display device including this illumination unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An illumination unit according to an embodiment of the present invention and a liquid crystal display device including this illumination unit will now be described with reference to the accompanying drawings.

Figure 1:
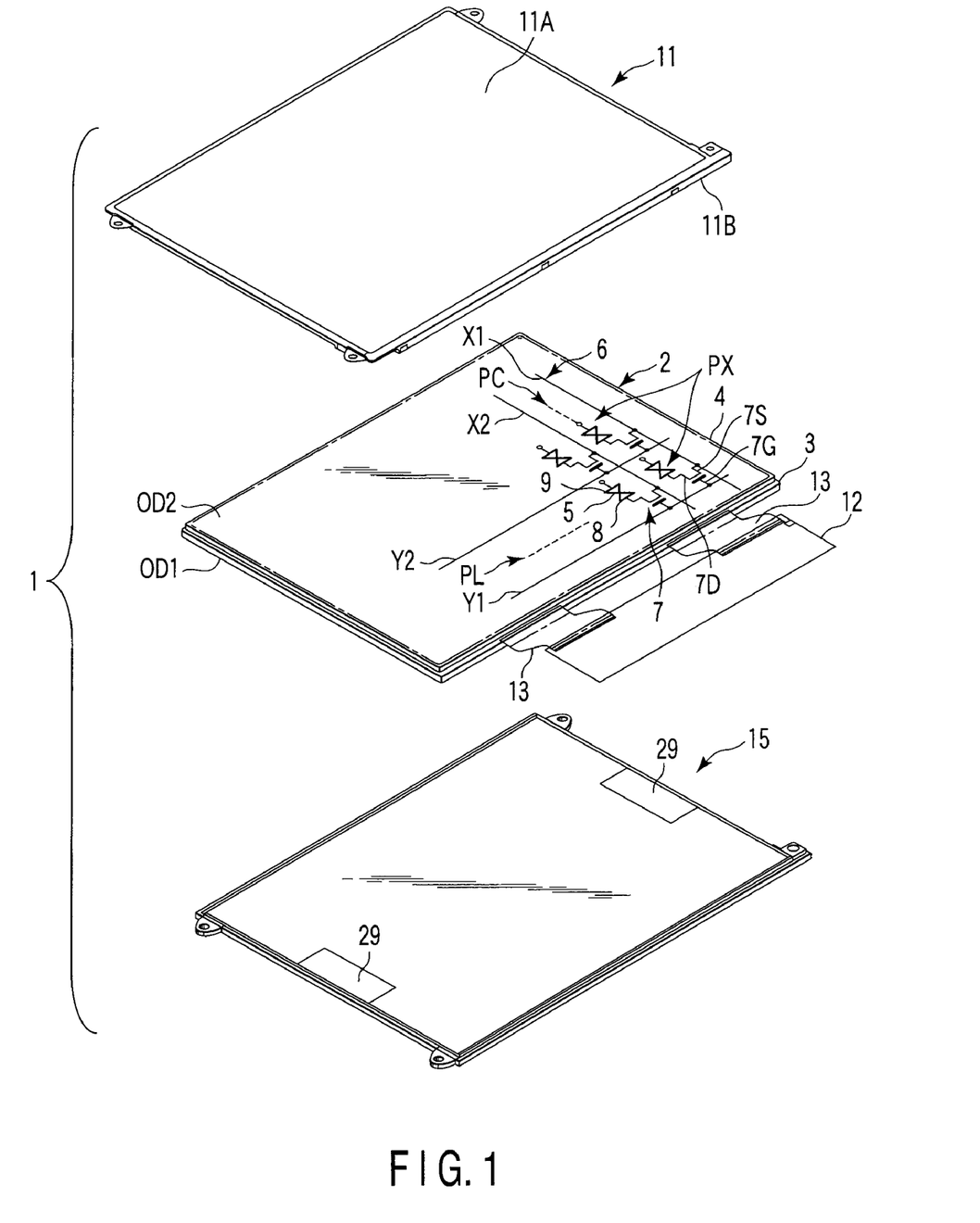
FIG. 1 is an exploded perspective view which schematically shows the structure of a liquid crystal display device according to an embodiment of the present invention.

As is shown in FIG. 1, a liquid crystal display device 1 includes a substantially rectangular, planar transmissive liquid crystal display panel 2, and an illumination unit 15 which illuminates the liquid crystal display panel 2. The liquid crystal display panel 2 is configured such that a liquid crystal layer is interposed between a pair of substrates. Specifically, the liquid crystal display panel 2 includes a rectangular array substrate 3, a rectangular counter-substrate 4, and a liquid crystal layer 5 functioning as an optical modulation layer which is sealed between the pair of substrates via alignment films. The array substrate 3 and counter-substrate 4 are attached by a seal material. The liquid crystal display panel 2 includes a substantially rectangular active area 6 that displays an image. The active area 6 is formed inside a region which is surrounded by the seal material, and is composed of a plurality of pixels PX that are arrayed in a matrix.

The array substrate 3 includes, in the active area 6, a plurality of scanning lines Y (1, 2, 3, ..., m), a plurality of signal lines X (1, 2, 3, ..., n), switching elements 7 which are disposed in association with the respective pixels PX, and pixel electrodes 8 which are connected to the switching elements 7.

The scanning lines Y extend in a direction parallel to the row direction of the pixels PX. The signal lines X extend in a direction parallel to the column direction of the pixels PX so as to cross the scanning lines Y via an insulation layer. Each of the switching elements 7 is disposed in a region including an intersection between the associated scanning line Y and signal line X.

The switching element 7 is composed of, e.g. a thin-film transistor (TFT) including a semiconductor layer which is formed of amorphous silicon or polysilicon. The switching element 7 has a gate electrode 7G that is electrically connected to the associated scanning line Y (or formed integral with the scanning line Y). The switching element 7 has a source electrode 7S that is electrically connected to the associated signal line X (or formed integral with the signal line X). The switching element 7 has a drain electrode 7D that is electrically connected to the pixel electrode 8 of the associated display pixel PX (or formed integral with the pixel electrode 8).

The counter-substrate 4 includes, in the active area 6, a counter-electrode 9 which is disposed common to a plurality of pixels PX or all the pixels PX. The pixel electrodes 8 and counter-electrode 9 are formed of an electrically conductive material with light transmissivity such as indium tin oxide (ITO) or indium zinc oxide (IZO). The array substrate 3 and counter-substrate 4 are disposed such that the pixel electrodes 8 and counter-electrode 9 are opposed to each other, and a gap is formed between the array substrate 3 and counter-substrate 4. The liquid crystal layer 5 is formed of a liquid crystal composition that is sealed in the gap between the array substrate 3 and counter-substrate 4. Those surfaces of the array substrate 3 and counter-substrate 4, which are in contact with the liquid crystal layer 5, are covered with alignment films.

In the liquid crystal display panel 2, optical elements OD1 and OD2 are provided on the outer surface of the array substrate 3 and the outer surface of the counter-substrate 4. The optical elements OD1 and OD2 include, for instance, polarizer plates, whose directions of polarization are set in accordance with the characteristics of the liquid crystal layer 5.

In a color-display type liquid crystal display device, the liquid crystal display panel 2 includes a plurality of kinds of pixels, for instance, a red pixel that displays red (R), a green pixel that displays green (G), and a blue pixel that displays blue (B). Specifically, the red pixel has a red color filter that passes light with a principal wavelength of red. The green pixel has a green color filter that passes light with a principal wavelength of green. The blue pixel has a blue color filter that passes light with a principal wavelength of blue. These color filters are disposed on the major surface of the array substrate 3 or counter-substrate 4.

The liquid crystal display device includes a bezel cover 11 having a rectangular frame-like shape. The bezel cover 11 includes a rectangular window portion 11A which exposes the active area 6 of the liquid crystal display panel 2, and a rectangular frame-shaped body portion 11B which defines the window portion 11A. The liquid crystal display panel 2 with the above-described structure is disposed between the illumination unit 15 and the bezel cover 11. Specifically, the illumination unit 15, together with the liquid crystal display panel 2, is formed integral with the bezel cover 11 in the state in which the upper surface of the illumination unit 15 is opposed to the back surface (i.e. array substrate-side surface) of the liquid crystal display panel 2. The illumination unit 15 illuminates the liquid crystal display panel 2 from the back side thereof.

The liquid crystal display device includes a driver circuit 12, which supplies a driving signal to the liquid crystal display panel 2. The driver circuit 12 is formed to have, for example, an elongated rectangular flat plate shape, and is electrically connected to one side edge of the liquid crystal display panel 2 via a flexible printed circuit board 13. The driver circuit 12 can be disposed on the back side of the illumination unit 15 by bending the printed circuit board 13.

Figure 2:
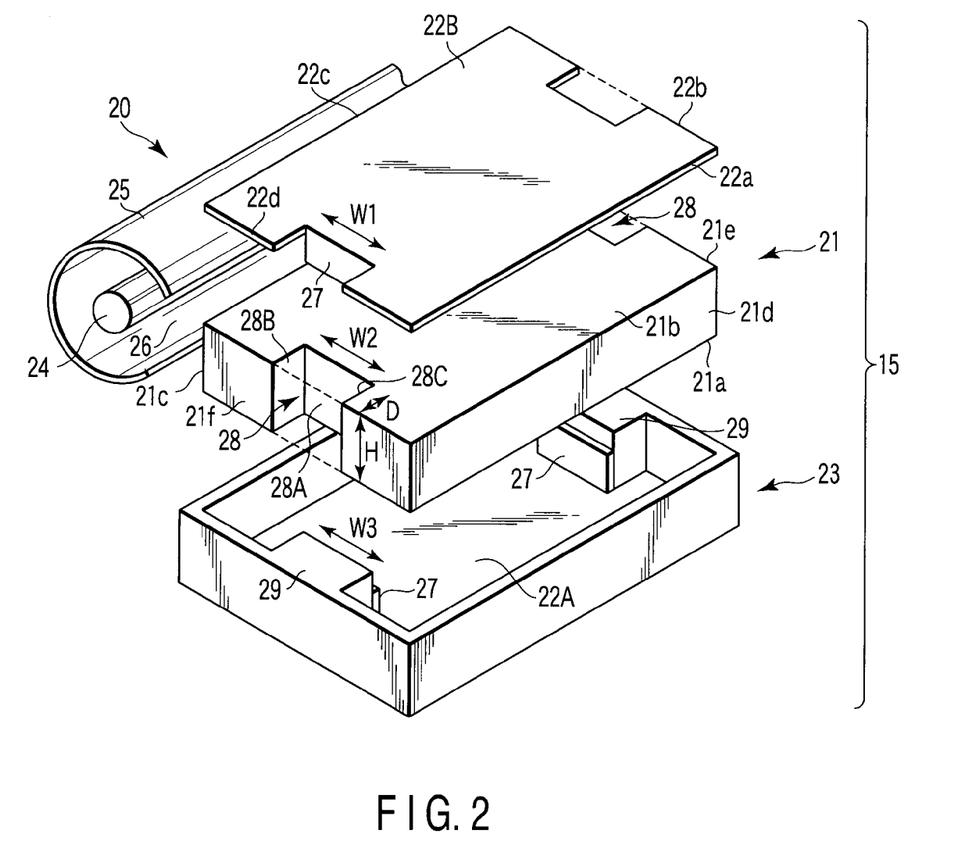
FIG. 2 is an exploded perspective view which schematically shows the structure of an illumination unit which is mounted in the liquid crystal display device shown in FIG. 1.

As is shown in FIG. 2, the illumination unit 15 includes a light source unit 20, a light guide plate 21, optical sheets 22 and a frame 23.

The light source unit 20 includes a cold-cathode fluorescent lamp 24 functioning as a light source, and a reflector 25 which surrounds the cold-cathode fluorescent lamp 24 and reflects emission light, which is emitted from the cold-cathode fluorescent lamp 24, toward the light guide plate 21. The reflector 25 has a substantially U-shaped cross section, and has an opening portion 26 for extracting emission light from the cold-cathode fluorescent lamp 24.

The light guide plate 21 has a function of converting the light emitted from the light source unit 20 to planar light and emits the planar light. The light guide plate 21 is formed of a light transmissive resin material such as an acrylic resin or a polycarbonate resin. The light guide plate 21 can be fabricated by injection molding or by a cutting process by cutting-out from a plate material. In the present embodiment, a flat-plate-shaped light guide plate 21 with a uniform thickness is described by way of example. Alternatively, a wedge-shaped light guide plate 21, which has a thickness gradually decreasing from one end toward the other end, may be used.

The light guide plate 21 has a first major surface 21a, a second major surface 21b that is opposed to the first major surface 21a, and four end surfaces 21c, 21d, 21e and 21f which connect the first major surface 21a and second major surface 21b. Each of the first major surface 21a and second major surface 21b is flat, and formed to have a substantially rectangular shape. Each of the four end surfaces 21c, 21d, 21e and 21f is formed in a rectangular shape. Of these four end surfaces, the end surface 21c, which is positioned on the side where the light source unit 20 is disposed, functions as a light incidence surface. The second major surface 21b functions as an emission surface for emitting light toward the liquid crystal display panel 2.

The illumination unit 15 includes, as optical sheets 22, an optical sheet 22A which is disposed on the first major surface 21a of the light guide plate 21 and an optical sheet 22B which is disposed on the second major surface 21b. In the example shown in FIG. 2, only one optical sheet 22B, which is disposed on the second major surface 21b, is shown. Alternatively, two or more optical sheets may be stacked and disposed. In general, about two to four optical sheets are stacked.

An optical sheet with various functions, such as a diffusion sheet, a lens sheet and an optical sheet having a plurality of functions, is used as the optical sheet 22B. In addition, a reflection sheet is used as the optical sheet 22A. The diffusion sheet has a function of diffusing light that passes through the diffusion sheet. The lens sheet has a function of collecting light that passes through the lens sheet. The reflection sheet has a function of reflecting light, which leaks out from the inside of the light guide plate 21, toward the inside of the light guide plate 21.

The optical sheets 22 are formed in a substantially rectangular shape having substantially the same size as the first major surface 21a and second major surface 21b of the light guide plate 21. In short, each optical sheet 22 has four sides. In the example shown in FIG. 2, if attention is paid to the optical sheet 22B that is disposed on the second major surface 21b of the light guide plate 21, the optical sheet 22B has four sides 22a, 22b, 22c and 22d. The side 22a is parallel to the long side of the end surface 21d of the light guide plate 21. Similarly, the side 22b is parallel to the long side of the end surface 21e, the side 22c is parallel to the long side of the end surface (incidence surface) 21c, and the side 22d is parallel to the long side of the end surface 21f.

The optical sheet 22 includes bent portions 27 which are formed by bending portions of the optical sheet 22 at a pair of opposed sides. If the optical sheet 22B is exemplified, the opposed sides 22b and 22d have bent portions 27. These sides 22b and 22d are different from the side 22c that faces the light source unit 20, and correspond to two sides neighboring the side 22c. For example, the bent portion 27 of the side 22b is formed by making two cuts in the optical sheet 22B from the side 22b, and bending a tongue-shaped portion (corresponding to a portion of the optical sheet 22B) between the two cuts at about 90°. The distance between the two cuts corresponds to a width W1 of the bent portion 27.

Although the optical sheet 22B is exemplified here, the optical sheet 22A may similarly be provided with bent portions at opposed sides, as shown in FIG. 2.

The light guide plate 21 has recess portions 28 in a pair of opposed end surfaces, in which the bent portions 27 of the optical sheet 22 are inserted. These opposed end surfaces correspond to two end surfaces 21e and 21f neighboring the incidence surface 21c. The recess portions 28 are recessed from the end surfaces 21e and 21f, and have retreat end surfaces 28A which retreat from the end surfaces 21e and 21f by a depth D. The retreat end surface 28A is substantially perpendicular to the major surface 21a, 21b over which the optical sheet 22 is laid. The recess portions 28 are formed at positions corresponding to the bent portions 27 when the respective sides of the optical sheet 22 are laid over the long sides of the end surfaces of the light guide plate 21. Each recess portion 28 has a width W2 that is not less than the width W1 of the bent portion 27.

With the bent portions 27 of the optical sheet 22 being inserted in the recess portions 28 of the light guide plate 21, the bent portions 27 come in contact with the retreat end surfaces 28A and the optical sheet 22 can be aligned with the light guide plate 21. Moreover, with the bent portions 27 of the opposed two sides of the optical sheet 22 being inserted in the recess portions 28 of the light guide plate 21, the movement of the optical sheet 22 in the direction along the sides 22a and 22c can be restricted. Therefore, the state in which the optical sheet 22 is aligned with the light guide plate 21 can be kept.

In the example shown in FIG. 2, each recess portion 28 has a height H that is equal to the thickness of the light guide plate 21, and is formed to have a rectangular shape with the width W2 and depth D in each of the first major surface 21a and second major surface 21b of the light guide plate 21. The rectangular shape, in this context, refers not only to the rectangular shape as shown in FIG. 2, but also to a trapezoid or a parallelogram.

The frame 23 holds at least the light guide plate 21. The frame 23 includes projection portions 29 having shapes corresponding to the recess portions 28 of the light guide plate 21. Specifically, the projection portions 29 are formed on a pair of opposed sides of the frame 23. The projection portions 29 have a width W3 which is not greater than the width W2 of each recess portion 28 of the light guide plate 21, and the projection portions 29 are fitted in the recess portions 28.

At this time, a slit-shaped space having a width that is not less than the thickness of the optical sheet 22 is formed between the recess portion 28 of the light guide plate 21 and the projection portion 29 of the frame 23. The bent portion 27 of the optical sheet 22 is inserted in the space that is thus formed. In this manner, the bent portions 27 of the optical sheet 22 are inserted and held between the recess portions 28 of the light guide plate 21 and the projection portions 29 of the frame 23. Thereby, the optical sheet 22, together with the light guide plate 21, is held by the frame 23.

In the present embodiment, the recess portions 28 in the light guide plate 21 are formed at central parts of the end surfaces 21e and 21f. In this case, needless to say, the bent portions 27 of the optical sheet 22 are formed at central parts of the sides 22b and 22d. The "central part", in this context, refers not only to an exact central part of the end surface of the light guide plate 21 or the side of the optical sheet 22, but also to any intermediate part which does not include both ends of the end surface or the side and is located between both ends (i.e. an intermediate part in a range from one end to the other end). In other words, the "central part" in the present embodiment corresponds to a position where the recess portion 28 of the light guide plate 21 can form a shape surrounded by the retreat end surface 28A and two opposed side surfaces 28B and 28C.

Thereby, the bent portion 27, which is inserted in contact with the retreat end surface 28A, is held between the two side surfaces 28B and 28C of the recess portion 28. Therefore, while the optical sheet 22 is aligned with the light guide plate 21, the movement of the optical sheet 22 in the direction along the sides 22b and 22d can be restricted.

In the example shown in FIG. 2, the light guide plate 21 includes one recess portion 28 at the central part of each of the end surfaces 21e and 21f. Alternatively, the light guide plate 21 may include a plurality of recess portions 28 at the central part of each of the end surfaces 21e and 21f. In this case, the optical sheet 22 may have a plurality of bent portions 27 at the central part of each of the sides 22b and 22d.

Figure 3:
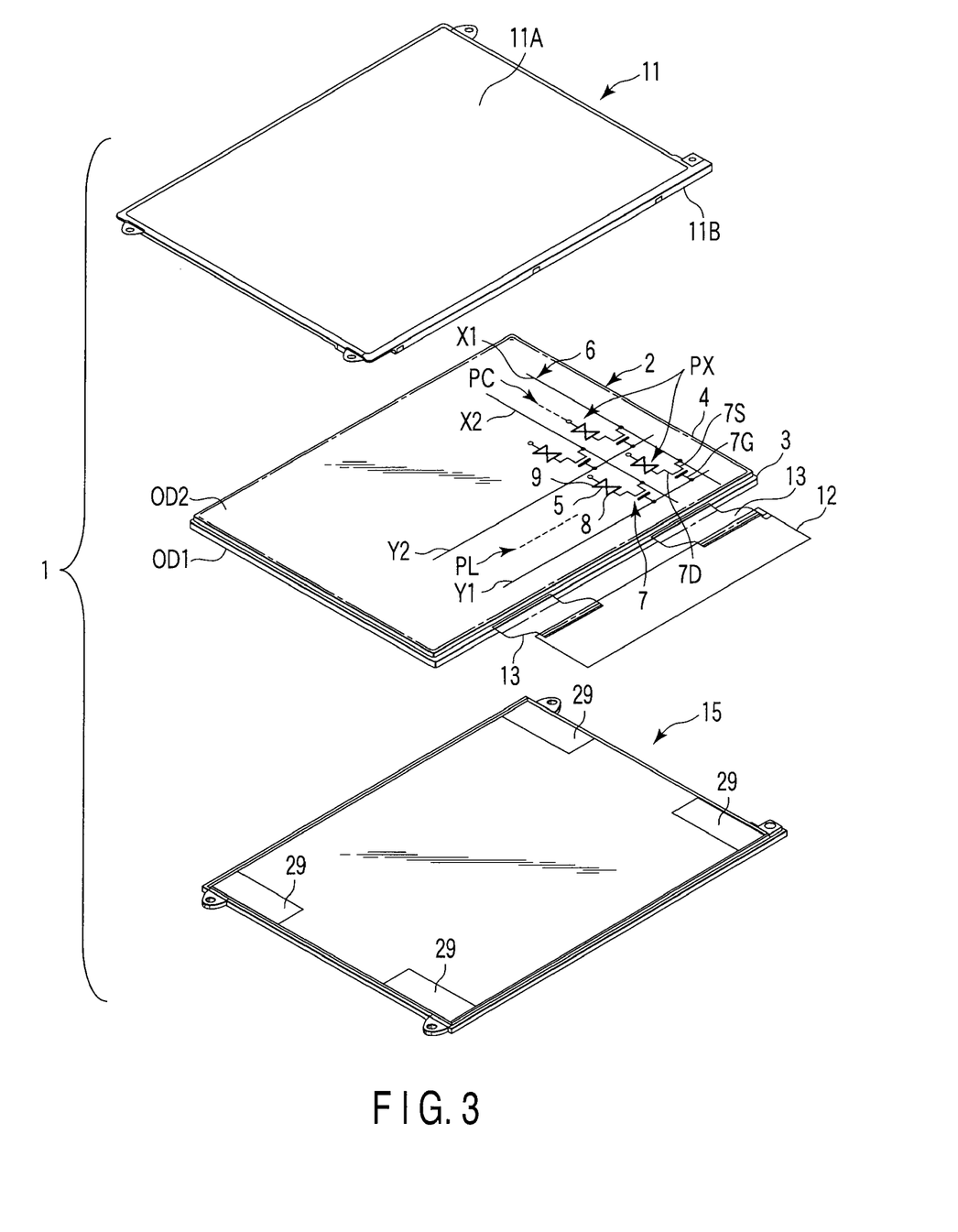
FIG. 3 is an exploded perspective view which schematically shows the structure of a liquid crystal display device according to a modification of the embodiment.
Figure 4:
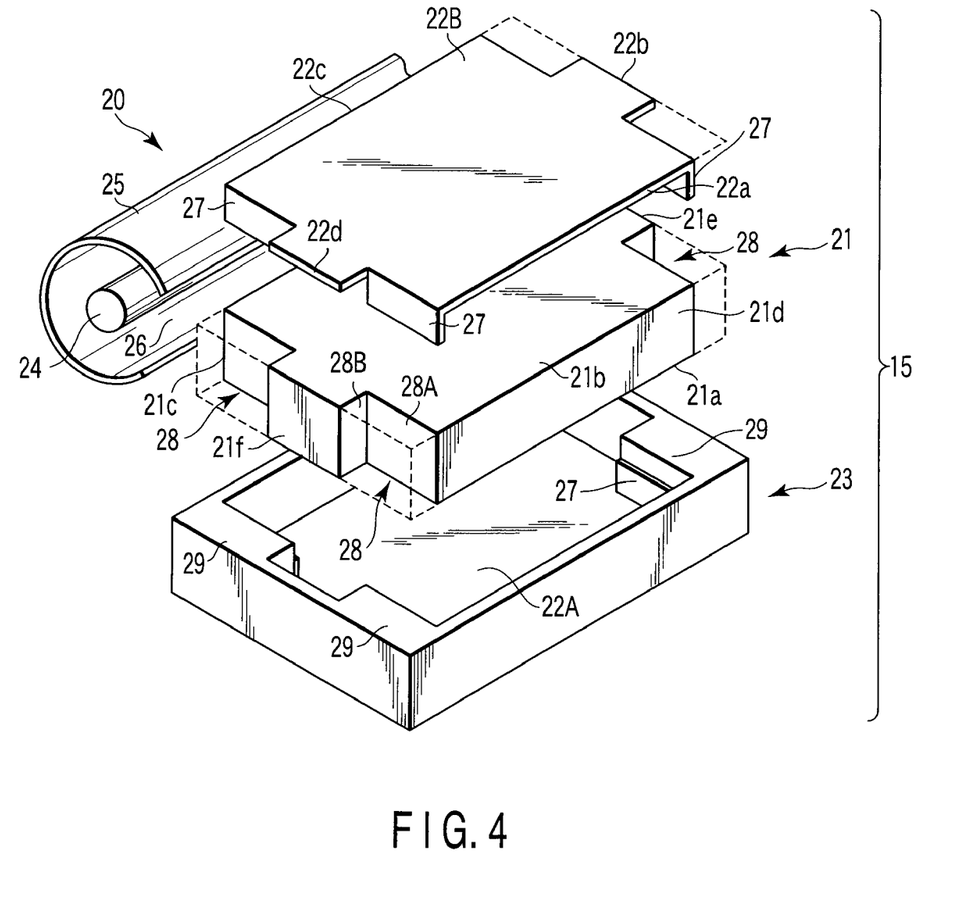
FIG. 4 is an exploded perspective view which schematically shows the structure of an illumination unit which is mounted in the liquid crystal display device shown in FIG. 3.

Next, a modification of the present embodiment is described with reference to FIG. 3 and FIG. 4. The structural parts common to those shown in FIG. 1 and FIG. 2 are denoted by like reference numerals, and a detailed description is omitted.

The optical sheet 22 includes bent portions 27 which are formed by bending portions of the optical sheet 22 at a pair of opposed sides. If the optical sheet 22B disposed on the second major surface 21b of the light guide plate 21 is described by way of example, the opposed sides 22b and 22d have bent portions 27. In particular, in this modification, the optical sheet 22 has bent portions 27 at both end portions of each of the sides 22b and 22d.

The light guide plate 21 has, in a pair of opposed end surfaces thereof, recess portions 28 in which the bent portions 27 of the optical sheet 22 are inserted. In particular, in the present modification, the recess portions 28 are provided at both end portions of the long side of each of the end surfaces 21e and 21f. Needless to say, the positions of the recess portions 28 correspond to the positions of the bent portions 27 of the optical sheet 22 when the optical sheet 22 is laid over the light guide plate 21.

In a case where one recess portion 28 is formed at one end portion of the end surface of the light guide plate 21, the recess portion 28 is formed by the retreat end surface 28A and one side surface 28B, and thus the side that is opposed to the side surface 28B is opened. In this manner, if the recess portion 28 is provided at only one end portion of the end surface of the light guide plate 21, the movement of the optical sheet 22 cannot be restricted. To cope with this problem, in the case where one recess portion 28 is provided at one end portion of the end surface of the light guide plate 21, at least one other recess portion 28 is provided in the same end surface (i.e. at least two recess portions 28 are provided in the same end surface). Thereby, while the optical sheet 22 is aligned with the light guide plate 21, the movement of the optical sheet 22 can be restricted. In this case, in the light guide plate 21, the recess portions 28 may be formed at both end portions of the same end surface, or one recess portion 28 may be formed at one end portion of the end surface and the other recess portion 28 may be formed at a central part of the end surface.

According to the present embodiment with the above-described structure, the bent portions 27 of the optical sheet 22, which is disposed on one major surface of the light guide plate 21, are disposed in the recess portions 28 of the light guide plate 21. Thus, the optical sheet 22 can easily be aligned with the light guide plate 21 without the need for a separate member, and the movement of the optical sheet 22 can be restricted and the optical sheet 22 can be kept in the aligned state.

In addition, according to the present embodiment, since the alignment and the restriction of movement can be achieved by the recess portions 28 formed in the light guide plate 21 and the bent portions 27 formed on the optical sheet 22, a separate member such as a double coated adhesive tape is not needed. Therefore, the manufacturing cost does not increase, and the structure for keeping the alignment state between the optical sheet 22 and light guide plate 21 can be simplified.

In the above-described embodiment, the description has been given of the illumination unit 15 in which one optical sheet 22 is disposed on the second major surface 21b of the light guide plate 21. Next, a description is given of an illumination unit 15 in which a plurality of optical sheets 22 are stacked on the second major surface 21b of the light guide plate 21.

Figure 5:
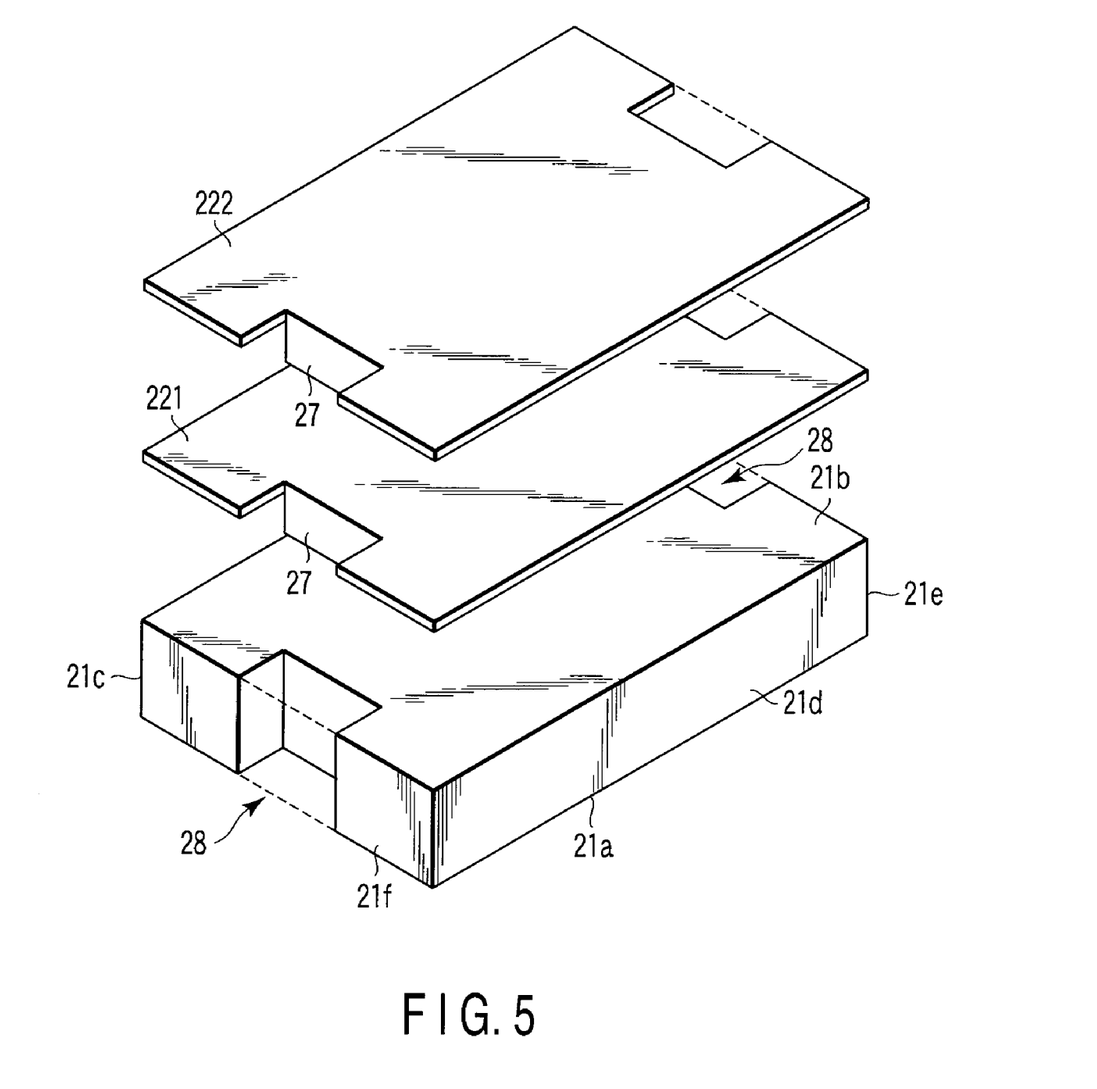
FIG. 5 is an exploded perspective view which schematically shows a structure in a case where a plurality of optical sheets are stacked on one major flat surface of a light guide plate in an illumination unit which is mounted in the liquid crystal display device shown in FIG. 1 or FIG. 3.

In an example shown in FIG. 5, two optical sheets 221 and 222 are disposed on the second major surface 21b of the light guide plate 21. In particular, all the optical sheets 221 and 222, which are stacked on the second major surface 21b, have bent portions 27 at the same position on their corresponding sides. The bent portions 27 on the respective sides of all the optical sheets 221 and 222 are inserted in one recess portion 28 formed in the associated end surface of the light guide plate 21. Thereby, all the optical sheets 221 and 222 can be aligned with the light guide plate 21, and this alignment state can be kept and the movement of all the optical sheets 221 and 222 can be restricted.

In the case where all optical sheets 221 and 222 have bent portions 27, the positions of the bent portions 27 may be displaced, and a plurality of recess portions 28, which correspond to all the bent portions 27, may be formed in the associated end surfaces of the light guide plate 21. With this structure, the same advantageous effects can be obtained.

Figure 6:
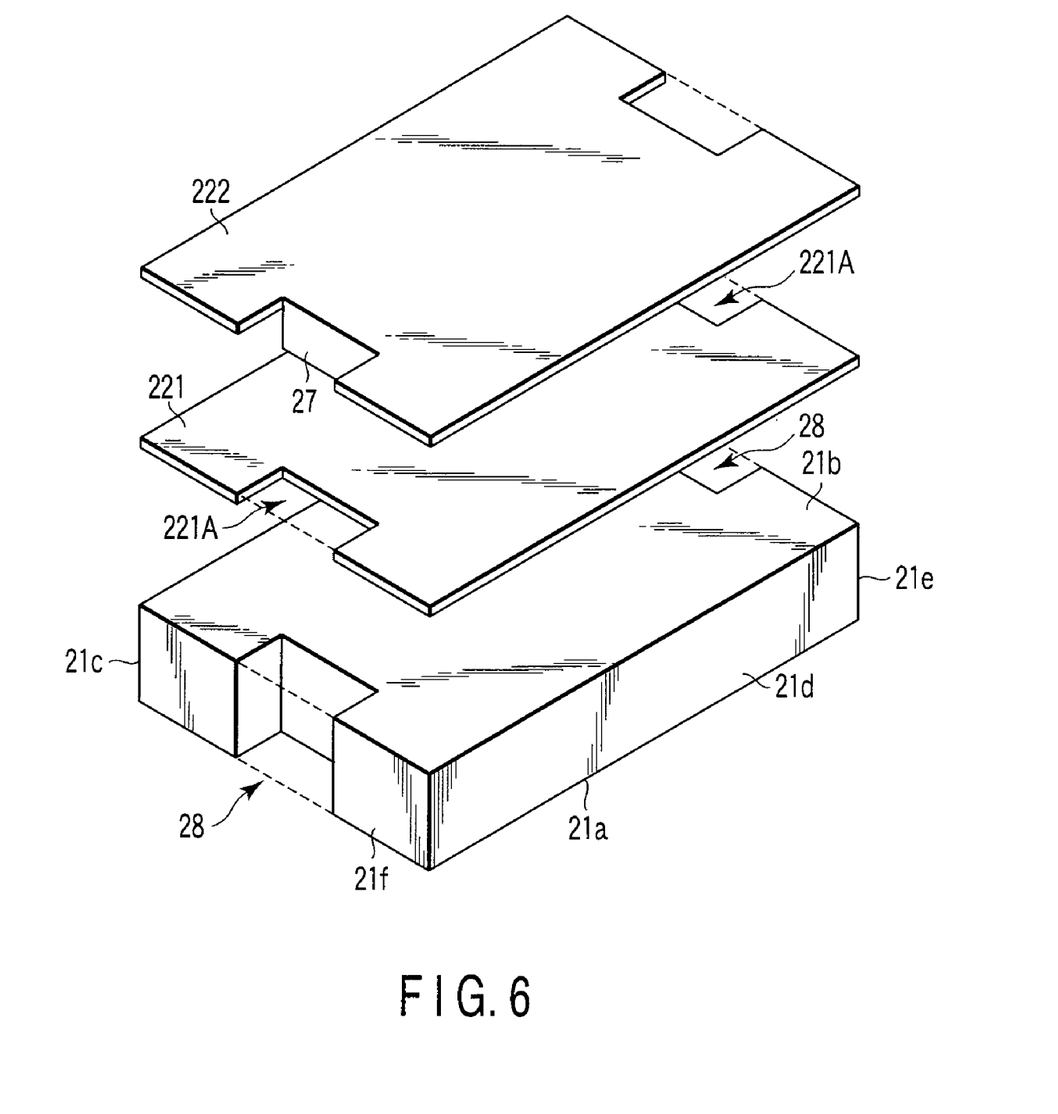
FIG. 6 is an exploded perspective view which schematically shows another structure in a case where a plurality of optical sheets are stacked on one major flat surface of a light guide plate in an illumination unit which is mounted in the liquid crystal display device shown in FIG. 1 or FIG. 3.

In an example shown in FIG. 6, two optical sheets 221 and 222 are disposed on the second major surface 21b of the light guide plate 21. In particular, only the uppermost optical sheet 222, which is stacked on the second major surface 21b, has bent portions 27. The optical sheet 221, which is disposed between the light guide plate 21 and the uppermost optical sheet 222, have notch portions 221A which overlap the recess portions 28 of the light guide plate 21. In other words, the optical sheet 222 having the bent portions 27 is stacked on the optical sheet 221 having the notch portions 221A. The bent portions 27 of the uppermost optical sheet 222 are inserted in the recess portions 28 of the light guide plate 21. Thereby, all the optical sheets 221 and 222 can be aligned with the light guide plate 21, and this alignment state can be kept and the movement of all the optical sheets 221 and 222 can be restricted.

In the examples shown in FIG. 5 and FIG. 6, the bent portion 27 is formed at the central part of the side, and the recess portion 28 is formed at the central part of the end surface. However, needless to say, as in the example shown in FIGS. 3 and 4, the same advantageous effects can be obtained even in the case where the bent portions 27 are formed at both end portions of the side and the recess portions 28 are formed at both end portions of the end surface.

The present invention is not limited directly to the above-described embodiment. In practice, the structural elements can be modified and embodied without departing from the spirit of the invention. Various inventions can be made by properly combining the structural elements disclosed in the embodiment. For example, some structural elements may be omitted from all the structural elements disclosed in the embodiment. Furthermore, structural elements in different embodiments may properly be combined.

For example, in the above-described embodiment, a backlight unit is exemplified as the illumination unit 15. Alternatively, a front-light unit, which can be combined with a reflective liquid crystal display panel, may be used as the illumination unit 15.

In the above-described embodiment, the cold-cathode fluorescent lamp 24 is exemplified as the light source of the illumination unit 15. Alternatively, a light-emitting diode (LED) may be used as the light source.

In the above-described embodiment, for example, the light source unit 20 is disposed so as to be opposed to one end surface of the light guide plate 21. Alternatively, a plurality of light source units may be disposed so as to be opposed to the end surfaces on which the recess portions 28 are not provided, namely, the end surfaces 21c and 21d in the example shown in FIG. 2.

The transmissive liquid crystal display panel, which has been described in the embodiment, may have any structure if at least a part of the active area 6 has a transmissive display function of selectively transmitting illumination light from the illumination unit 15. This transmissive liquid crystal display panel may include a transflective liquid crystal display panel which is configured such that each of pixels includes a reflective part and a transmissive part.

In the above-described embodiment, for example, a description has been given of the driving mode in which liquid crystal molecules, which are included in the liquid crystal layer, are driven by making use of a vertical electric field which is generated between the pixel electrodes on the array substrate side and the counter-electrode on the counter-substrate side. However, the illumination unit having the above-described structure may be applied to a liquid crystal display panel which includes pixel electrodes and a counter-electrode on one of the substrates and which adopts a driving mode in which liquid crystal molecules are driven by making use of a horizontal electric field which is substantially parallel to the surface of the substrate.

What is claimed is:

1. An illumination unit comprising:
   a light guide plate; and
   at least one optical sheet which is disposed on a major surface of the light guide plate,
   wherein the optical sheet includes bent portions which are formed by bending portions of the optical sheet at a pair of opposed sides, and
   the light guide plate includes, at a pair of opposed end surfaces, recess portions in which the bent portions are inserted.

2. The illumination unit according to claim 1, further comprising a frame which holds the light guide plate,
   wherein the frame has projection portions which are fitted in the recess portions of the light guide plate, and
   the bent portions of the optical sheet are held between the recess portions of the light guide plate and the projection portions of the frame.

3. The illumination unit according to claim 1, wherein the recess portions are formed at central parts of the associated end surfaces, and
   the bent portions are formed at central parts of the associated sides.

4. The illumination unit according to claim 1, wherein the recess portions are formed at both end parts of the associated end surfaces, and
   the bent portions are formed at both end parts of the associated sides.

5. The illumination unit according to claim 1, wherein a plurality of said optical sheets are stacked on the light guide plate, and
   all the optical sheets have the bent portions.

6. The illumination unit according to claim 1, wherein a plurality of said optical sheets are stacked on the light guide plate,
   an uppermost optical sheet of the plurality of optical sheets has the bent portions, and
   the optical sheet, which is disposed between the uppermost optical sheet and the light guide plate, has notch portions which overlap the recess portions of the light guide plate.

7. A liquid crystal display device comprising:
   a liquid crystal display panel; and
   an illumination unit which illuminates the liquid crystal display panel, the illumination unit comprising:
   a light guide plate; and
   at least one optical sheet which is disposed on a major surface of the light guide plate,
   wherein the optical sheet includes bent portions which are formed by bending portions of the optical sheet at a pair of opposed sides, and
   the light guide plate includes, at a pair of opposed end surfaces, recess portions in which the bent portions are inserted.

* * * * *